ate such a method wherein a substance is provided for use in supplying to the water of a vessel a substance for precluding bacterial growth therein.

Another object is to provide, for use in filtering water for swimming pools, and the like, a composition of materials for precipitating organic matter from the water while providing a substance for destroying bacterial growth in the water.

Another object is to provide a method of treating water, particularly water employed for bathing, to render the water pleasing in appearance and safer for use by bathers.

These, together with other objects and advantages, are achieved through employment of the method and composition of matter herein disclosed and will become more readily apparent by reference to the following description.

DESCRIPTION OF THE PREFERRED EMBODIMENT

The method and mixture of complexes of the instant invention are particularly suited for use in treating water confined in swimming pools, and the like. However, it is to be understood that the method and mixture of complexes of the instant invention can be employed to advantage in various environments in which it is desirable to treat water for removing organic matter and rendering the water bacteria-free.

The method includes employing a mixture of complexes consisting essentially of cuprous iodide and copper carbonate, in a filtering system including a filter medium, such as a filter bed, diatomaceous earth, and the like, not shown. It is important to appreciate that the filter medium employed serves to separate particulate matter from water passed therethrough as the water is caused to be circulated through the system.

The cuprous iodide employed is supplied in a quantity sufficient to provide an effective concentration of approximately 0.1 ppm to 10.0 ppm. The copper carbonate is supplied in a quantity sufficient to provide an effective concentration of approximately 0.1 ppm to 10.0 ppm. Of course, these concentrations may be varied as found desirable, however, approximately a one-to-one ratio of cuprous iodide to copper carbonate is deemed to be suitable.

The cuprous iodide and copper carbonate are preferably introduced into the flowing water immediately upstream from the filter medium employed in the pool's circulation system. As a practical matter, where the pool's filter medium is of the diatomaceous earth type, the cuprous iodide and copper carbonate are added to the flowing stream of water with the diatomaceous earth.

Where the filter medium is of the sand filter type, the cuprous iodide and copper carbonate are simply added to the flowing stream of water immediately upstream from the filter medium.

It is important to appreciate that, in practice, the cuprous iodide and copper carbonate pass as particulate matter along with the flowing stream of water to the filter medium where the cuprous iodide and copper carbonate are filtered from the flowing stream of water by the filter medium. Consequently, these complexes serve to coat the filter medium with a layer of water insoluble source of copper ions and elemental iodine. This layer additionally serves as a filtering medium for removing additional organic matter from the flowing stream of water, as the stream is passed through the filter medium.

It is particularly important to note that by coating the filter medium with a layer of water insoluble source of copper ions and elemental iodine, the copper ions and iodine are rendered available for use in oxidizing any organic matter which comes in contact therewith. Additionally, the copper ions are released to the water as an algaecide while the iodine is released as a bactericide.

Subsequently, an oxidant, such as chlorine, is added to the water of the pool, downstream from the pool's filter medium. This oxidant serves to release additional elemental iodine from the cuprous iodide coated on the filter medium. Of course, oxidants other than chlorine, such as hypochlorites, permanganates, persulfates, and the like, may be employed. The oxidant is introduced into the water in a quantity sufficient to provide an effective concentration thereof of approximately 0.1 ppm to 10.0 ppm.

It should therefore be apparent that the method and mixture of complexes of the instant invention provide a practical solution to the vexatious problem of removing both organic matter and bacteria from bodies of water.

Although the invention has been herein shown and described in what is conceived to be the most practical and preferred embodiment, it is recognized that departures may be made therefrom within the scope of the invention, which is not to be limited to the illustrative details disclosed.

Having described the invention, what is claimed as new is:

1. A method for removing both organic matter and bacteria from a body of water confined in a vessel including a filter system having a filter medium for separating solids from flowing water of the body of water, said method comprising:

A. introducing into the filter system, immediately upstream from the filter medium, a mixture of complexes consisting essentially of cuprous iodide and copper carbonate whereby the filter medium is coated with a layer of substantially water insoluble source of copper ions and elemental iodine; and B. adding to the body of water, downstream from the filter medium, an oxidant selected from a class of oxidants including chlorine for releasing elemental iodine from the cuprous iodide.

\* \* \* \* \*

3,926,802

METHOD FOR REMOVING BOTH ORGANIC MATTER AND BACTERIA FROM A BODY OF WATER

BACKGROUND OF THE INVENTION

The invention generally relates to a method and a mixture of complexes for treating bodies of water for removing therefrom bacteria and organic matter, and more particularly to a method wherein a mixture of complexes including cuprous iodide and copper carbonate are applied to a filter medium for removing both bacteria and algae from the water of swimming pools.

The prior art, of course, includes numerous mechanical and chemical systems intended for use in removing bacteria, algae, and various organic materials from bodies of water confined within swimming pools and the like. Frequently, treatment of the water is achieved through an addition of a strong oxidant which attacks living organisms for bringing about their death. Solid residue is filtered from the water through filter systems having included therein filter mediums often including diatomite, often referred to as diatomaceous earth, and similar substances.

Chlorine has been accepted generally as an extremely effective disinfectant when introduced into a body of water. However, chlorine alone has many disadvantages, particularly when employed in the treating of water confined in swimming pools. Among such disadvantages is the increased inefficiency of chlorine which attends increases in pH, the dissipation of chlorine to atmosphere in the presence of light and heat, the general ineffectiveness of chlorine in the presence of relatively large masses of organic matter, the relatively short effective life span of chlorine, and the tendency of chlorine to irritate the skin and mucous membranes of bathers. Thus the use of chlorine as a decontaminant has many recognized disadvantages, but continues to be employed in such a capacity due to a lack of a suitable substitute.

Moreover, when using chlorine as a decontaminant, matter such as mucous, hair, skin, oils and greases tend to seal the interstices of filter mediums and require frequent backwashing and thus render the filter medium relatively inefficient.

Attempts have been made to utilize elemental iodine for purposes of decontaminating swimming pools. However, such use has not met with widespread acceptance due to the fact that the pool water becomes murky, discolored and generally displeasing in appearance.

Of course, control of the growth of algae in home pools has proved to be a formidable task to the home owner. Often the procedures required to eradicate or control algae are of a drastic nature. Such procedures consequence, typified by sandblasting and/or acid washing. As a consequency, many pool owners become dissatisfied. Consequently, the industry tends to suffer.

While it is known that copper ions function as an algicide, use of copper in swimming pools for this purpose generally is avoided simply because the copper ions tend to bond to the carbonate in the plaster of the pool walls and thus stain the walls an unsightly color.

It is therefore the general purpose of the instant invention to provide a method and a mixture of chemical complexes for treating bodies of water such as those found in swimming pools and the like as the water is circulated through filter systems for overcoming the aforementioned difficulties and disadvantages.

OBJECTS AND SUMMARY OF THE INVENTION

Accordingly, it is an object of the invention to provide an improved method for treating bodies of water.

Another object is to provide an improved method for maintaining the water of swimming pools pleasing in appearance and substantially free from bacteria and algae without subjecting bathers to chemically induced irritation.

It is another object to provide an improved method for removing from swimming pools both bacteria and organic matter, without subjecting bathers to chemically induced irritation, while simultaneously assuring an efficient filtering of filter mediums employed in systems connected with the pool.

These and other objects and advantages are achieved by introducing a mixture of substantially water-insoluble chemical complexes including $CuCO_3$ and $CuI$ into a filter system, upstream of the employed filter medium, connected within a swimming pool so that the mixture is applied to and caused to coat the surfaces of the filter medium and thereafter accelerating the liberation of elemental iodine through an introduction of chlorine into the pool downstream of the filter.

DESCRIPTION OF THE PREFERRED EMBODIMENT

While chlorine generally is accepted as a bactericide, it also has been demonstrated that iodine, a less irritating bactericide, is released from complexes including iodine in the presence of an oxidant such as chlorine. It also has been demonstrated that metallic ions of the transition series also constitute oxidizing agents having a propensity to attack organic matter including algae, fungi and the like. Field tests conducted over a period of years have proven that copper iodide having a solubility factor of 0.8 parts per million in ordinary water and copper carbonate having a solubility factor of from 0.3 to 1.5 parts per million are effective in maintaining a swimming pool in a decontaminated condition for substantially increased periods, when compared to decontaminated conditions achieved through a use of chlorine alone, without discoloring the pool or the walls of the pool.

Moreover, it has been found that when this mixture of complexes, which are thought to be substantially insoluble but which do, in fact, dissolve quite slowly in pool water, is applied to the surface of a filter medium such as diatomite, there is a propensity for these complexes to coat the medium and thus serve as a continuous source of oxidizing agents, as they dissolve over long periods, for oxidizing both bacteria and organic matter deposited by pool water flowing therethrough.

The mixture of complexes employed consists of a mixture of equal parts by weight of dry complexes including copper carbonate and cuprous iodide. This mixture is added to the filter circulation system upstream of the filter medium in quantities sufficient to thoroughly coat the filtering area of the filter medium. As a practical matter, the results of this technique are two-fold. First, an oxidation-reduction system is established by the presence of the complexes on the surface of the filter medium so that organic particles and bodies of living matter, including bacteria and algae, are oxidized and thus destroyed as the water passes through the filter medium. Moreover, collection of organic matter, bacteria and living bodies on the surface of the medium is avoided due to the oxidation-reduction reaction continuously occuring on the surface of the medium. Thus, the pool water is decontaminated as it flows through the filter medium while the filter system tends to remain in a free-flowing condition.

In practice, it has been found desirable to accelerate the rate of release of elemental iodine from the cuprous iodide of the complex. This is achieved by assuring the presence of a slight amount of selected oxidant. The oxidants which may be employed are chlorine, oxygen, peroxide, potassium permanganate and bromine, but the most practical has been found to be chlorine. Chlorine may be introduced in any well known form such as $Cl_2$ or HOCL in order to increase the rate of release of free iodine into water. It will be appreciated that the greater the quantity of chlorine introduced into the pool water the greater will be the amount of elemental iodine released into the water therefore the quantity of chlorine required is established empirically. It is here noted that since there normally is maintained in the pool an undissolved quantity of cuprous iodide, it is possible to release an excessive amount of free iodine through an introduction of an excessive quantity of chlorine and thus cause a discoloration of the pool water to occur. In order to dissipate the discoloration, additional chlorine may be added to the pool, preferably remote from the filter. It is postulated that the free iodine is caused to react with the free copper ions in the presence of the excess chlorine. In any event, it has, in practice, been found that the discoloration caused by an introduction of an excessive amount of chlorine is dissipated once additional chlorine is added.

It should be apparent that elemental iodine and copper ions pass with the water from the filter and continuously maintain an oxidation-reduction reaction throughout the body of water for thus aiding in or totally preventing the growth of bacteria, algae, fungi, and certain viruses. Due to the low solubility factor of both the cuprous iodide and copper carbonate complexes, in water, the effective life of the complexes within the body of pool water is of a substantial duration, much greater than that of chlorine alone, so that treatment of the pool water is, in effect, substantially continuous and thus the complexes continuously maintain the water in a decontaminated condition over long periods of time.

In some 50 swimming pools tested over a period of months, the desired condition of decontamination was achieved when the copper content was caused to average approximately 1.0 parts per million, while the iodine content was maintained within a range extending between 0.2 parts per million and 2.5 parts per million. The resulting condition of the pool water was clear, blue and natural, even though free iodine, which normally is expected to discolor the water to an undesirable brown to green color, was present in sufficient quantities to act satisfactorily as a bactericide. It is postulated that the copper ions present in the water prevents the elemental iodine from building to an excessive concentration.

Moreover, a condition of equilibrium between the copper ions and carbonate ions found in the pool prevented free copper ions from reacting with the carbonates in the plaster of the surfaces of the pools. Thus, staining was avoided, even though the copper ions were present in sufficient quantities to oxidize algae and other organic matter for relatively long periods.

Copper iodide, here employed, is provided by reacting molar quantities of copper sulfur pentahydrate and potassium iodide, while simultaneously injecting sulfur dioxide as a fluid into the resulting mixture. The copper carbonate is produced by adding a molar solution of copper sulfate pentahydrate to a molar solution of sodium carbonate.

It is believed that in view of the foregoing description the invention will be fully understood, however, it will be reviewed briefly at this point.

Normally, a swimming pool, such as a so-called home pool, has connected therewith a filtering system including a filter containing a filter medium such as diatomite. In order to decontaminate the pool employing the method of the instant invention a mixture of complexes comprising equal parts, by weight, of copper carbonate and cuprous iodide is introduced into the swimming pool. The amount of the mixture introduced may be empirically determined, however, approximately one ounce per 4,000 gallons of water serves satisfactorily. The mixture is added by depositing it in the skimmer or similar access opening immediately upstream of the filter unit. Thereafter, chlorine, in an empirically determined quantity, is added to the body of the pool for accelerating the release of the elemental iodine from the cuprous iodide. It is believed that the reactions are as follows.

The copper carbonate and cuprous iodide are substantially insoluble in water and dissolve quite slowly, however, in the presence of chlorine, the copper of the cuprous iodide releases iodide ions which subsequently form elemental iodine. The copper carbonate also slowly dissolves providing cupric and cuprous ions over long periods of time. The carbonate ions remain free to recombine with copper ions before the copper ions can bond with the carbonate ions found in the plaster of the pool wall.

Moreover, it has been established that cupric ions and iodide ions will react to form cuprous iodide and elemental iodine. However, such reactions cannot be relied upon for general usage in decontaminating swimming pools.

In veiw of the foregoing, it should readily be apparent that the method and mixture which embodies the principles of the instant invention provides a practical solution to the perplexing problem of controlling the growth of bacteria and algae in the water of swimming pools, while simultaneously maintaining the employed filter in a free-flowing condition, without subjecting the skin, eyes and mucous membranes of bathers to the irritating effects of chlorine.

Although the invention has been shown and described in what is conceived to be the most practical and preferred method and mixture, it is recognized that departures may be made therefrom within the scope of the invention, which is not to be limited to the illustrative details disclosed.

Moreover, while the method and mixture which embody the principles of the instant invention have particular utility in treating bodies of water confined within swimming pools connected with filter systems and similar devices, it is to be understood that the method and mixture also have utility in treating bodies of water confined within vessels not having a filter system connected thereto. Therefore, it is to be understood that the method and mixture which embody the principles of the instant invention can be successfully employed in treating a body of water, regardless of whether or not the confining vessel is connected with a filter system.

Although the invention has been shown and described in what is conceived to be the most practical and preferred method and mixture, it is recognized that departures may be made therefrom within the scope of the invention, which is not to be limited to the illustrative details disclosed.

Having described my invention, what I claim as new and desire to secure by Letters Patent is:

1. In a method of treating a body of water substantially confined in a swimming pool with iodine, the improvement comprising the steps of:

introducing into a selected body of water substantially confined in a swimming pool, upstream of the filter medium for a filtration system provided for the pool, a suitable quantity of a mixture of complexes including substantially equal parts by weight of cuprous iodide and copper carbonate for establishing in the body of water a concentration of copper ions above 0.015 parts per million but less than 2.0 parts per million copper ions and adding to the body of water a sufficient quantity of an oxidant selected from a class of oxidants, including chlorine, for causing elemental iodine to be released from the cuprous iodide in quantities sufficient for maintaining in solution in said body a concentration of free iodine above 0.1 parts per million but less than 5.0 parts per million, whereby free iodine is slowly released from the cuprous iodide in the presence of chlorine unattended by discoloration of the water for thus rendering the body of water safe and pleasing in appearance.

* * * * *

UNITED STATES PATENT OFFICE
CERTIFICATE OF CORRECTION

Patent No. 3,926,802        Dated December 16, 1975

Inventor(s) Joel Hedgpeth

It is certified that error appears in the above-identified patent and that said Letters Patent are hereby corrected as shown below:

Column 1 -

Line 57, delete "consequence" and insert

--- are ---.

Column 1 -

Line 58, delete "consequency" and insert

--- consequence ---.

Signed and Sealed this ninth Day of March 1976

[SEAL]

Attest:

RUTH C. MASON
*Attesting Officer*

C. MARSHALL DANN
*Commissioner of Patents and Trademarks*